United States Patent [19]

Hayes

[11] Patent Number: 4,520,716
[45] Date of Patent: Jun. 4, 1985

[54] DRIP-TYPE COFFEE MAKING APPARATUS

[76] Inventor: Susan M. Hayes, 11 W. 69th St., New York, N.Y. 10023

[21] Appl. No.: 590,604

[22] Filed: Mar. 19, 1984

[51] Int. Cl.³ .......................... A47J 31/02; A47J 31/10
[52] U.S. Cl. ........................................ 99/306; 99/295
[58] Field of Search ................. 99/306, 295, 304, 313, 99/316, 279, 298; 426/433

[56] References Cited

U.S. PATENT DOCUMENTS

| | | |
|---|---|---|
| 1,546,434 | 7/1925 | Catalano . |
| 2,885,290 | 5/1959 | Krasker . |
| 3,215,060 | 11/1965 | Perlov ................................ 99/306 |
| 4,069,751 | 1/1978 | Gronwick et al. . |
| 4,167,136 | 9/1979 | Chupurdy .......................... 99/306 |
| 4,211,157 | 7/1980 | Sakai et al. . |
| 4,303,525 | 12/1981 | Stover . |
| 4,417,504 | 11/1983 | Yamamoto ........................ 99/306 |

Primary Examiner—Robert W. Jenkins
Attorney, Agent, or Firm—Nolte, Nolte and Hunter

[57] ABSTRACT

A drip-type coffee-making apparatus which includes a closed-wall vessel having an open top, and an open bottom, a hinged lid integrally formed with the wall of the vessel, a mesh extended across and fixed to the interior of the vessel proximate the bottom end, a ridge formed around the perimeter of the vessel at the bottom, a shallow coffee-holding basket the top of which has a groove which fits the ridge of the brewing vessel, a filter support, and a support for the vessel and basket at the bottom of the basket for placing the apparatus on a coffee receptacle, preferably a cup.

16 Claims, 10 Drawing Figures

DRIP-TYPE COFFEE MAKING APPARATUS

BACKGROUND OF THE INVENTION

The present invention relates to the art of drip-type coffee-making apparatus and, in particular, to a new apparatus which improves brewing.

It is known in the art of coffee-making to prepare hot coffee by passing water, usually at or just below boiling temperature, through coffee grounds which are prevented from passage with the water by a filter such as a permeable paper membrane.

One of the principal problems involved in brewing coffee in this fashion, especially small quantities of coffee, is the difficulty in getting the hot water to become intimately associated with all of the grounds in order to obtain efficient extraction of the coffee. If a small quantity of coffee is placed in the basket of a conventional drip coffee maker or percolator, there is difficulty in wetting the grounds so that they do not simply float to the surface of the water with little extraction taking place. In addition, there is a tendency for the water to form channels through a thin bed of coffee, and extraction of coffee will be achieved in only limited areas of the bed of grounds. It is for this reason that most present approaches to the brewing of coffee in this manner, and in particular a cup or two of coffee, in a drip coffee-maker often involve the use of the encapsulated grounds.

For example, U.S. Pat. No. 4,069,751 Gronwick et al discloses a coffee brewing receptable 22 which may be used as a drinking vessel or mug. A basket 24 is adapted to rest or sit on upper edges of the cylindrical walls of the receptacle 22, while a filter 32 having a flat bottom 32a and generally currugated side wall 32b is supported on radiating spokes 24d. The radiating spokes 24d, along with rim portion 24f, define another wall 24h around the periphery thereof to stabilize the basket. A generally cup-shaped liner 28 fits within basket 24 over coffee dispersed on filter paper 32 to maintain a consistency of the physical distribution of the coffee while hot water is added to make the filtered coffee. However, the Gronwick et al apparatus requires an intricately designed attachment means to retain the basket 24 and the liner 28 in assembled relationship. Furthermore, there is but limited means to restrict the rate of flow of water through the coffee grounds.

U.S. Pat. No. 4,417,504 Yamamoto also shows a coffee set for making coffee which is directed to a funnel-shaped dripping body 4 disposed in an outer case 3.

U.S. Pat. No. 4,303,525 to Stover discloses a funnel having ribbed supports for a filter, U.S. Pat. No. 4,211,157 to Sakai et al shows a coffee maker which has a housing provided with a hinged cover at its top hingedly connected to a housing, the inner side of the cover provided with a receptacle for receiving condensation water. U.S. Pat. No. 2,885,290 to Krasker shows a cup-rim-engaging receptacle 32.

Each of the apparatus of the disclosures above, as well as apparatus generally known in the art, suffer one or more of several defective characteristics which ultimately detract from brewing performance and/or efficient operation of the apparatus. It is an object of the present invention to provide an apparatus and method of preparing coffee by the drip-type method which resolves the primary brewing defects of drip-type coffee making known to date.

BRIEF DESCRIPTION OF THE INVENTION

The present invention is an apparatus and method of preparing drip-type coffee which includes a closed-wall vessel having an open top end, with a closing means, for introducing hot water into the vessel, and an open bottom end at which is located a first attachment means around the circumference thereof, as well as a water distribution means, such as a mesh extended across the interior thereof, which, in turn is fixed along its circumference to the interior wall of the vessel. Another water distribution means can be an impermeable layer with slots formed therein for allowing water to pass therethrough over essentially all of the coffee grounds. Such slots can be, for example, radial or circumferential.

The coffee-making apparatus also includes a shallow coffee holding basket having a closed bottom with at least one drain hole and a circumferential wall substantially coextensive with the wall of the vessel, which is formed with a second attachment means at the top thereof that fits cooperatively with the first attachment means of the vessel to form a seal around the circumference of the resulting composite walled structure. The basket also has a filter support means on the interior of the closed bottom so that the basket can be lined with a coffee filter before the addition of the coffee grounds, and a basket support means on the exterior of the closed bottom whereby the basket and, thus, the composite structure can be supported on the rim of the opening of a coffee receptacle.

Preferably, the coffee-making apparatus has a generally circular circumferential shape, and the closing means or the top of the vessel is a hinged lid formed integrally with the wall of the vessel.

The filter support means, located on the interior of the bottom of the coffee basket, is in one embodiment upwardly oriented ridges extended radially inward from the wall of the basket, and the basket support means is preferably downwardly oriented ridges extending radially inward from the wall of the basket, the ridges of both sets being at an approximately equal distance from each other. It has been found that the optimum number of filter support ridges and coffee-making support apparatus ridges is eight, and that the apparatus operates efficiently when there are two drain holes in the bottom of the basket portion.

An optional feature which has been found to also provide for efficient operation, is a breather slot formed in the bottom of the basket which prevents formation of a total vacuum in the composite structure. Such breather slot can be easily provided by a gap extending radially inward from the wall to the substantial center of the closed bottom. In a preferred embodiment, the coffee-making apparatus is designed to fit over the top of a coffee cup of not more than about 4 inches in diameter.

Furthermore, the vessel can be provided with a holding feature on the outside thereof, such as grooves formed in the surface of the outside wall.

The attachment means located on the bottom end of the vessel can be conveniently provided by an outwardly projecting ridge extending continuously around the outside perimeter of the wall of the vessel at the lower end thereof, while the second attachment means can be a groove extending continuously around the inside of the wall of the basket portion at the top thereof, such groove having an opening sufficient to receive the outwardly projecting ridge and to form a seal therewith. Thus, the vessel can be snapped into a water-tight seal with the basket to form the composite structure of the coffee-making apparatus. Alternatively, the cooperating attachment means located on the bottom end of the vessel and at the top of the basket portion can be a thread and groove by which the components can be screwed together. The thread and groove can be arranged in any desired order, e.g., the thread on the top or bottom component, and the same for the groove.

By use of this design of coffee-making apparatus, an improved system for preparing coffee by the drip-type method is provided by forming a thickness of coffee grounds distributed over a filter supported on the filter support means of the basket. When the brewing vessel is snapped onto the coffee-making basket, the coffee grounds are compressed to a uniform thickness by means of the water-permeable mesh or barrier with slots for water drainage extended across the bottom end of the brewing vessel which has orifices sufficiently small to prevent the migration of grounds therethrough. Hot water is then introduced to the vessel at the top end thereof, followed by closing the vessel with a lid to form at least a partial vacuum autogenously as the water cools and drips through the grounds. The mesh extended across the interior of the brewing vessel also provides a mechanism by which the water is pan dripped over all portions of the compressed coffee grounds.

As a result of the apparatus and method of the present invention, the rate of flow-through, as well as the heat loss experienced in the coffee-making apparatus is decreased. Several factors contribute to this controlled flow-through of coffee which results in optimal brewing conditions. First of all, the compressed thickness of coffee prevents the rapid passage of water therethrough. Secondly, the mesh or other water drainage means provided in the interior of the brewing vessel distributes the water and slows the rate of passage therethrough so that a substantially equal flow-through is achieved over the entire coffee area. Next, the partial vacuum formed by the closure of the brewing vessel prevents the rapid exit of water therefrom.

Furthermore, as a result of the restrictive orifices of the mesh or slots, optimum advantage is taken of the amount of coffee grounds deposited since the grounds are prevented from migrating upward and onto the sides of the vessel.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
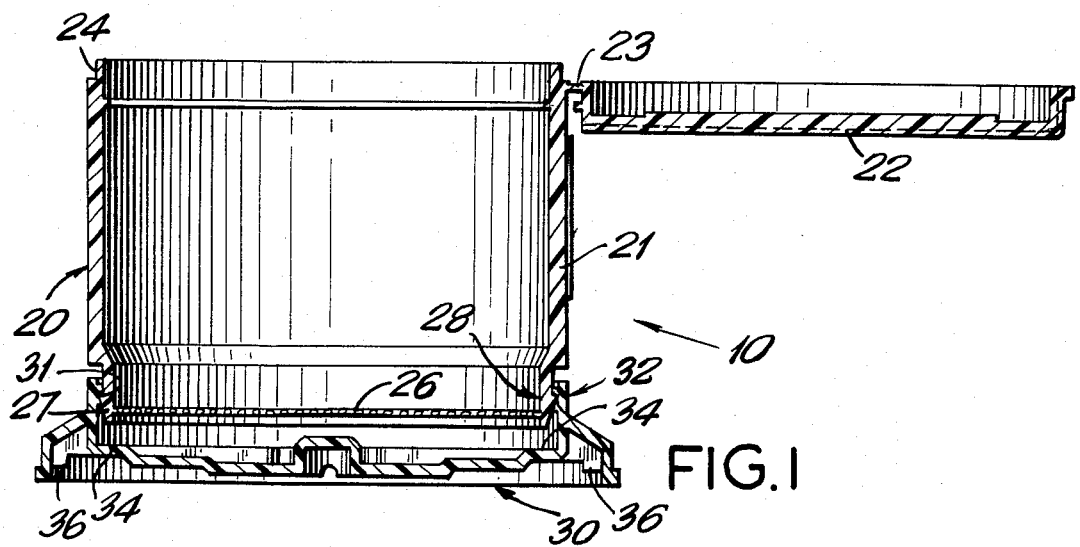
FIG. 1 is a full section of a side elevation view of a fully assembled coffee-making apparatus in accordance with the present invention.

FIG. 1 is a cross section of a side elevation of the composite structure 10. The upper portion of the coffee-making apparatus is a vessel 20 which, in the embodiment shown in the figures, has a lid 22 as a closing means. The vessel 20 shown in the figures herein has a generally circular circumferential wall 21 and the lid 22 is shown as attached by a hinge means 23 which can be formed integrally with the vessel wall 21. In order to provide a smooth wall exterior, the outside surface of wall 21 can be provided with perimeter indentations 24 to accept the rim 22 when it is placed in the closed position. (See FIGS. 4–6.)

Figure 1A:
FIG. 1a is a blow-up of the cross section of the mesh shown in FIG. 1.
Figure 1B:
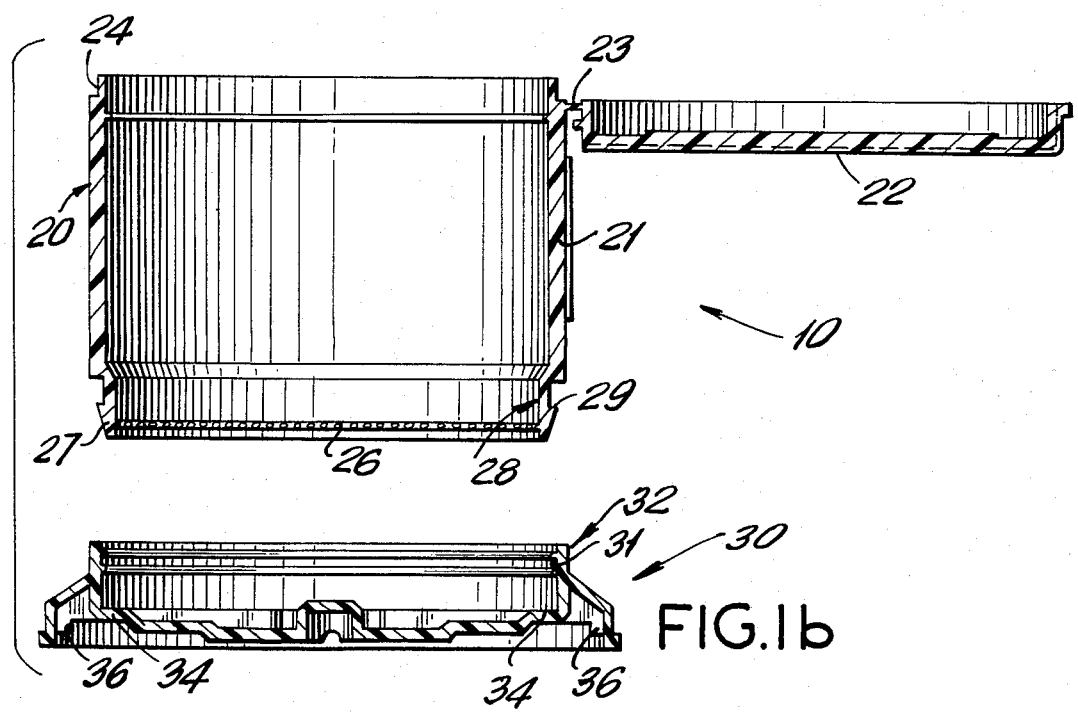
FIG. 1b is an exploded view of the coffee-making apparatus depicted in FIG. 1.

The vessel 20 also has a water distribution means, such as mesh 26, which is extended across the interior of the brewing vessel at the bottom end thereof and is secured circumferentially to the interior surface of wall 21. A detail of the cross section of mesh 26 is shown at FIG. 1a. In order to prevent migration of coffee grounds from the basket when water is added, the mesh holes are preferably about 0.5 mm in diameter. Alternatively, the water distribution means can be a water impermeable barrier with slots or slits through which water can pass. (This alternative is not shown).

A further feature of the present invention is a first attachment means 28 provided at the bottom of vessel 20 which, in the embodiment shown herein, includes primarily the outwardly extending ridge 29 formed compositely with outwardly diverging walls 27 around the outside perimeter of the vessel wall 21. In another embodiment not depicted herein, the first attachment means can be a thread or spiraling groove for screwing the top vessel onto the receiving component.

The coffee-making apparatus also includes a coffee ground basket portion 30 which is relatively shallow in comparison to the overall composite structure, and which includes a second attachment means 32 shown here as a groove 31 extending circumferentially around the interior of the wall of said coffee basket and located at the top thereof to receive outwardly extending ridge 29 of the vessel to form a water-tight seal therewith. As indicated above, the second attachment means can also be a thread or spiraling groove whereby the top vessel and basked can be screwed together.

Figure 2:
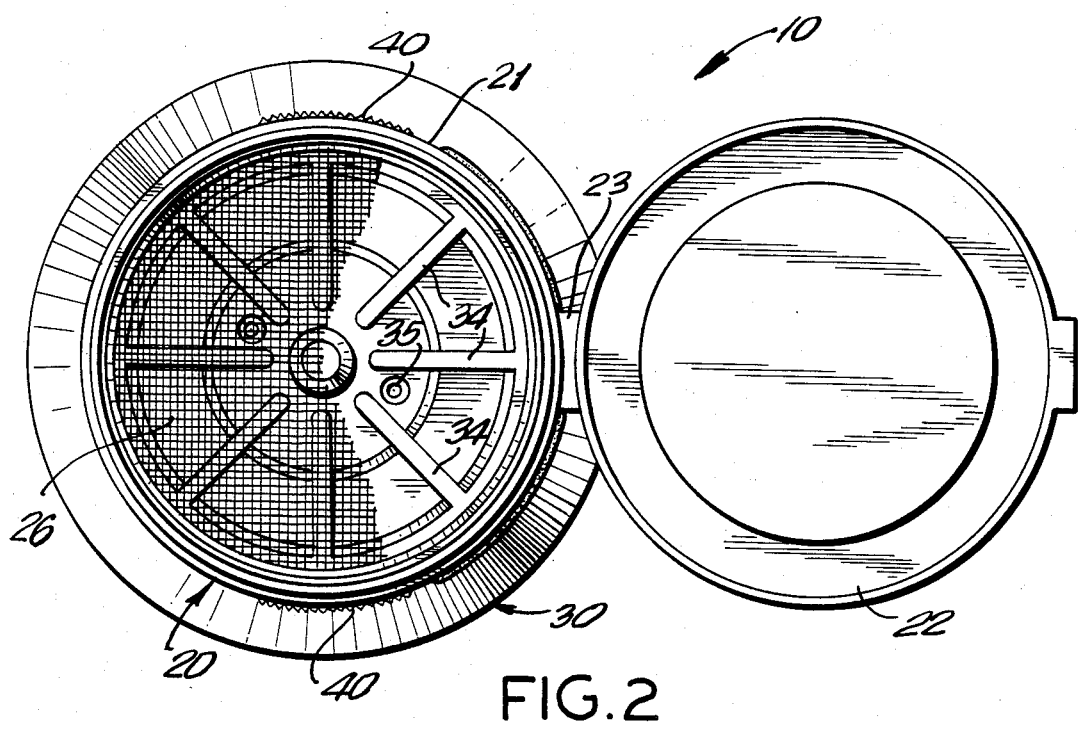
FIG. 2 is a plan view of the coffee-making apparatus with the lid open and cutaway.

Closed bottom coffee-holding basket also has a filter support means such as upwardly projecting ridges 34 which extend inwardly from the basket wall at approximately equal distances from each other. (Also see FIG. 2.)

Figure 3:
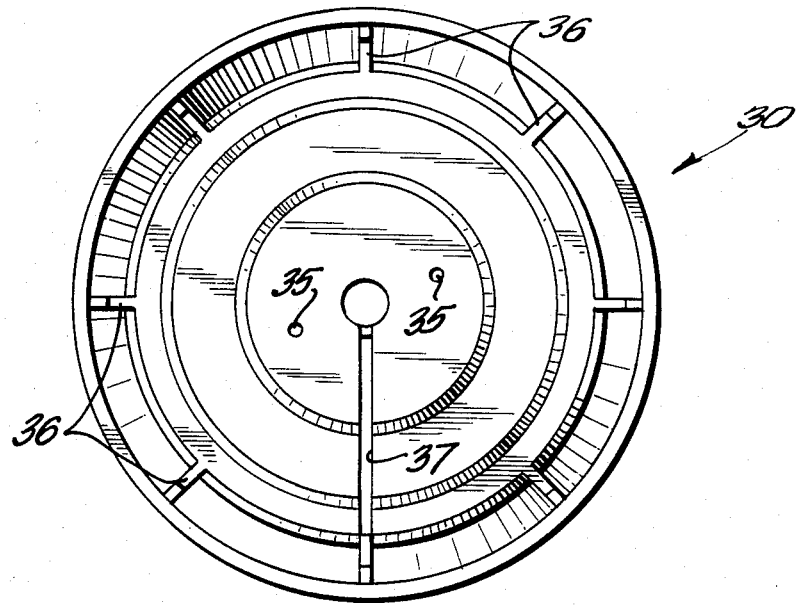
FIG. 3 is a bottom view of the basket of the coffee-making apparatus.

At least one drain hole, shown here as orifices 35, must be provided in order to allow passage of the brewed coffee into a receiving vessel. In order, however, to place the basket and, thereby, the composite structure of the coffee-making apparatus, on a coffee-receiving vessel, basket support means are provided on the bottom of the basket. In the embodiment disclosed herein, such means are shown as downwardly extending ridges 36 which are extended radially inward from the wall of the basket and in a preferred embodiment of the invention, a breather slot 37 is provided in order to facilitate control of the vacuum within the composite structure. (See FIG. 3.)

Figure 7:
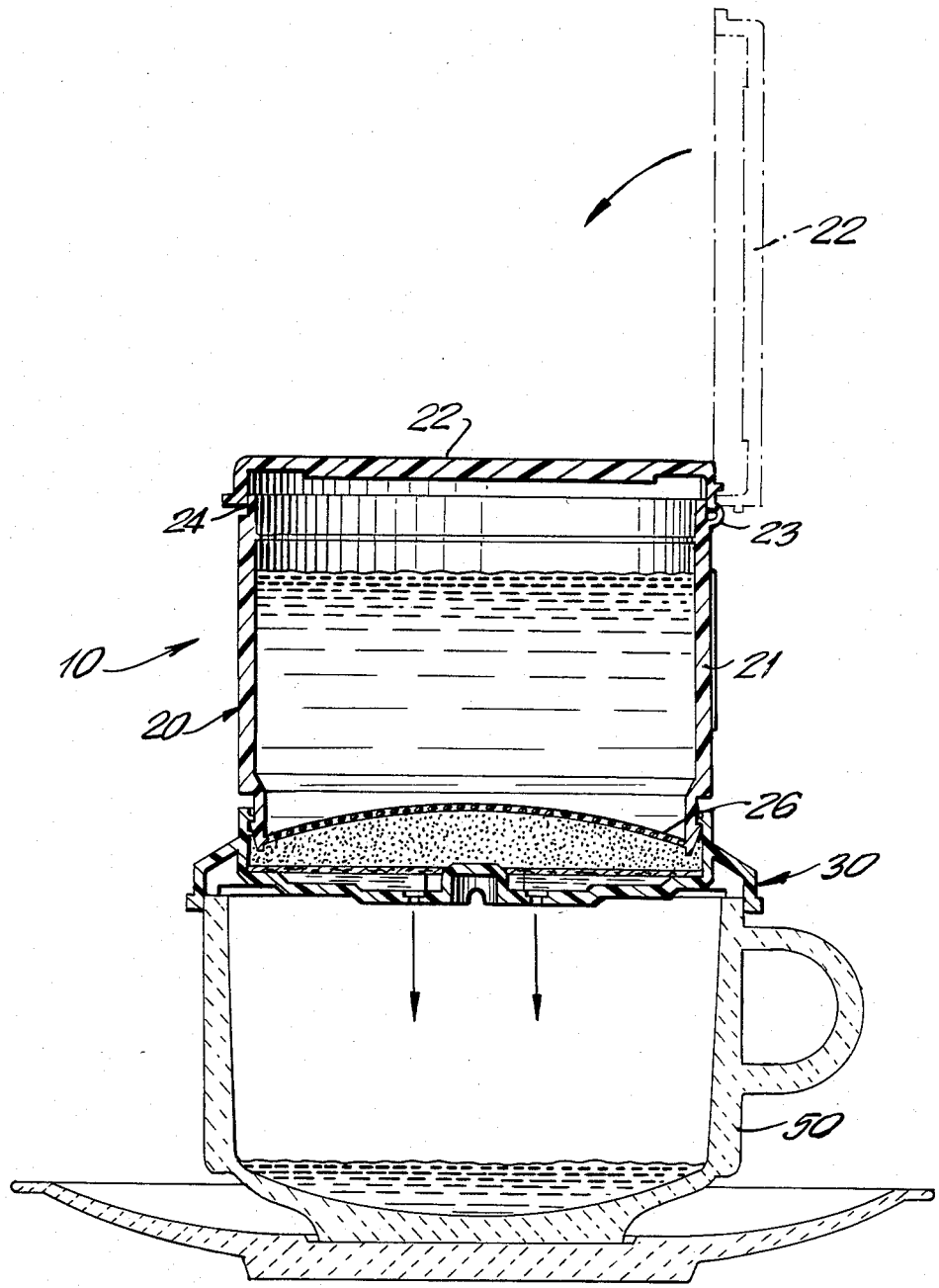
FIG. 7 is a side elevation of one embodiment of an apparatus of the present invention in operation.

In order to use the coffee-making apparatus, see FIG. 7, the filter basket is lined with a filter after which coffee grounds are deposited thereon. The vessel is then snapped onto the coffee basket thus compressing and distributing the coffee grounds over the interior space formed between the closed bottom of the basket and the mesh 26. This space is primarily where the coffee is brewed, i.e., the coffee flavor, etc. is extracted from the grounds.

The entire structure can then be placed on a coffee receptacle, such as coffee cup 50 shown in FIG. 7, and hot water, usually just below the boiling temperature, is poured therein. Closing means, or lid 22, shown in phantom in the open position in FIG. 7 is then shut in order to provide a partial autogenously formed vacuum which controls the rate of flow-through of the water and also facilitates retention of heat. As an added convenience, the lid 22 provides a handy receptable for catching dripping water when the apparatus is removed. The user need only turn the apparatus upside down before transferring it to a cleaning station such as a sink or coffee ground disposal area.

Figure 4:
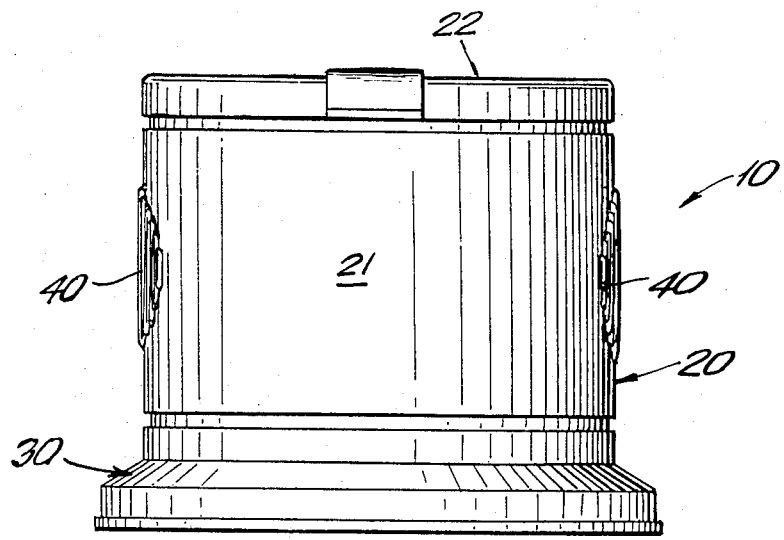
FIG. 4 is a front elevation view of the assembled coffee-making apparatus with the lid closed.
Figures 5, 6:
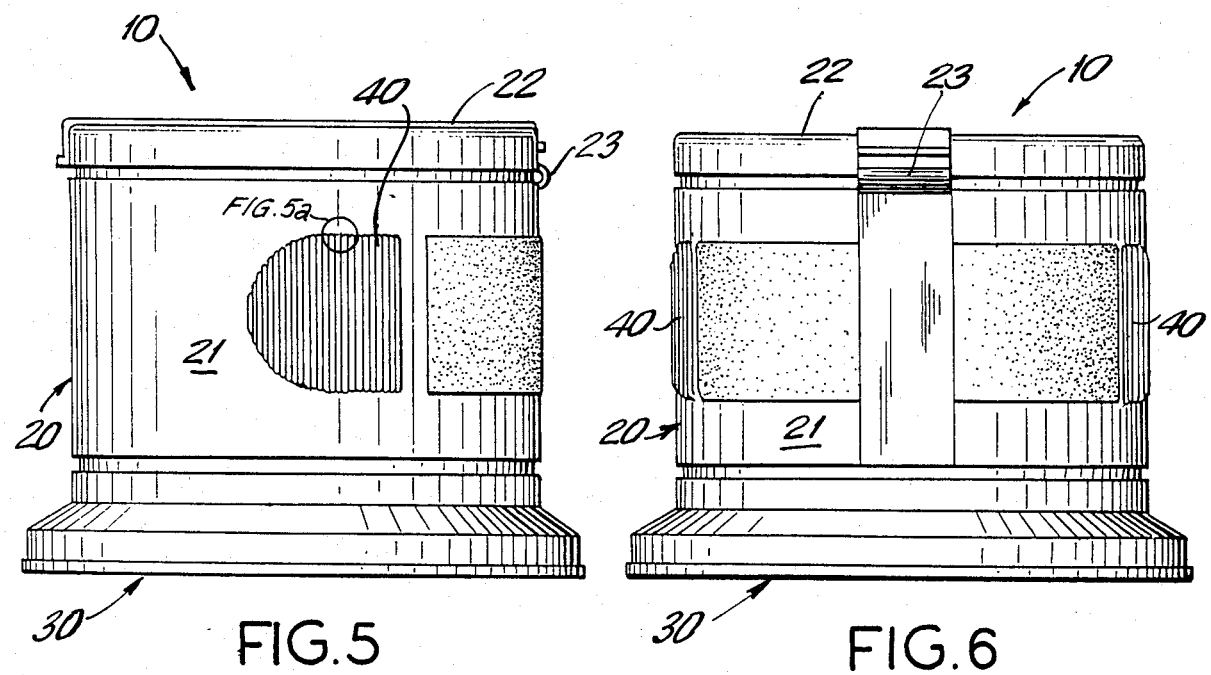
FIG. 5 is a side elevation view of the assembled coffee-making apparatus with the lid closed.
FIG. 6 is a rear elevation view of the assembled coffee-making apparatus with the lid closed.
Figure 5A:
FIG. 5a is a cross section of the detail circled in FIG. 5.

In FIGS. 4-6, a preferred embodiment of the invention is shown in the assembled and closed condition, which also has a non-slip grasping means, grooves 40 (see FIG. 5a), formed on the exterior surface of the wall 21 at locations where a user normally grasps the apparatus.

As a result of the present invention, the coffee-making apparatus conveniently makes a single serving of coffee of about 8 oz. using only 1 oz. of coffee grounds as compared to other coffee makers which require a greater amount because of inefficient coffee brewing characteristics.

While there has been described what are presently believed to be the preferred embodiments of the invention, those skilled in the art will realize that changes and modifications may be made thereto, to include provisions for a multiple cup coffee-making apparatus, without departing from the spirit of the invention, and it is intended to claim all such changes and modifications as fall within the true scope of the invention.

What is claimed is:

1. A drip-type coffee-making apparatus comprising:
   a closed-wall vessel having an open top end for introducing hot water into said vessel and an open bottom end, said vessel comprising a means for closing said top end, a water distribution means extended across and fixed along its circumference to the interior wall of said vessel proximate to the bottom end, and a first attachment means at the bottom end of said vessel, and
   a shallow coffee-holding basket having a closed bottom and circumferential wall substantially coextensive with the wall of said vessel; said wall of said basket having a second attachment means at the top thereof which fits cooperatively with said first attachment means of said vessel to form a seal around the circumference thereof resulting in a composite water-tight walled structure,
   said basket further comprising a filter-support means on the interior of said closed bottom for lining with a coffee filter, at least one drain hole in said basket bottom whereby liquid passes through said bottom, and a basket support means on the exterior of said closed bottom whereby said basket and, thus, said composite structure is supported on the rim of the opening of a coffee receptacle.

2. The coffee-making apparatus of claim 1, wherein said means for closing said top end of said vessel is a hinged lid formed integrally with the wall of said vessel.

3. The coffee-making apparatus of claim 1, wherein the shape of said apparatus is circular.

4. The coffee-making apparatus of claim 1, wherein said filter support means comprises upwardly oriented ridges extending radially inward from the wall of said basket at substantially equal distances from each other.

5. The coffee-making apparatus of claim 4, wherein there are eight upwardly oriented ridges.

6. the coffee-making apparatus of claim 1, wherein said basket support means comprises downwardly oriented ridges extending radially inward from the wall of said basket at substantially equal distances from each other.

7. The coffee-making apparatus of claim 6, wherein there are eight downwardly oriented ridges.

8. The coffee-making apparatus of claim 1, wherein there are two drain holes in the bottom of said basket.

9. The coffee-making apparatus of claim 1, wherein said bottom of said basket further comprises a breather slot in said closed bottom for preventing formation of a total vacuum in said composite structure.

10. The coffee-making apparatus of claim 9, wherein said breather slot extends radially from said wall to the center of said closed bottom.

11. The coffee-making apparatus of claim 1 which is designed to make one cup of coffee and to fit over the top of a coffee cup.

12. The coffee-making apparatus of claim 11, wherein the diameter of the top of said cup is not more than about 4 inches.

13. The coffee-making apparatus of claim 1, wherein the outside wall of said vessel has a non-slip holding means formed thereon.

14. The coffee-making apparatus of claim 13, wherein said holding means is series of grooves located at positions where a user normally grasps said coffee-making apparatus.

15. The coffee-making apparatus of claim 1, wherein said first attachment means is an outwardly projecting ridge extending continuously around the perimeter of the wall of said vessel at the lower end thereof and
   said second attachment means is an inwardly oriented groove extending continuously around the inside of the wall of said basket at the open top end thereof, said groove having an opening sufficient to receive said outwardly projecting ridge and to form a seal therewith,
   whereby said vessel is snapped into a water-tight seal with said basket to form said composite structure.

16. The coffee-making apparatus of claim 1 wherein said first attachment means is one of a thread and a cooperting spiraling groove and said second attachment means is the other of said thread and said cooperating spiraling groove whereby said vessel is screwed onto said basket.

* * * * *